United States Patent [19]
Duchateau et al.

[11] Patent Number: 6,041,622
[45] Date of Patent: Mar. 28, 2000

[54] METHOD AND APPARATUS FOR HEATING THE CHANGE OF A GLASS FURNACE

[75] Inventors: Eric Duchateau, Clarendon Hills; Louis Philippe, Oakbrook Terrace, both of Ill.; Dominique Jouvaud, Paris, France; Robert Plessier, Marseille, France; Claude Pivard, Paris, France; Etienne Lepoutre, St-Germain-en-Laye, France; Jean-Thierry Duboudin, Vincennes, France

[73] Assignee: L'Air Liquide, Societe Anonyme pour l'Etude et l'Exploitation des Procedes Georges Claude, Paris, France

[21] Appl. No.: 09/159,544

[22] Filed: Sep. 24, 1998

Related U.S. Application Data

[60] Division of application No. 08/764,878, Dec. 16, 1996, Pat. No. 5,853,448, which is a continuation-in-part of application No. 08/765,885, Jan. 8, 1997.

[30] Foreign Application Priority Data

Jan. 5, 1996 [FR] France ................................ 96 00076

[51] Int. Cl.[7] ............................... C03B 5/435; F23Q 9/00; F23D 23/00
[52] U.S. Cl. .......................... 65/134.4; 65/346; 65/347; 431/278; 431/283; 432/195; 432/196
[58] Field of Search .................................... 432/195, 196; 65/134.1, 134.4, 136.2, 136.3, 346, 347; 431/278, 283

[56] References Cited

U.S. PATENT DOCUMENTS

| | | | |
|---|---|---|---|
| 3,620,514 | 11/1971 | Geiger, Jr. et al. | 432/26 |
| 4,909,733 | 3/1990 | Yap | 432/195 |
| 5,242,296 | 9/1993 | Tuscon et al. | 431/10 |
| 5,346,524 | 9/1994 | Shamp et al. | 65/134.4 |

FOREIGN PATENT DOCUMENTS

| | | |
|---|---|---|
| 335728 | 10/1989 | European Pat. Off. . |
| 2728254 | 6/1996 | France . |
| 41 42 401 | 6/1993 | Germany . |
| 7-10545 | 1/1995 | Japan . |

OTHER PUBLICATIONS

C. Taylor, "Development of a Low–Emission, Multi–fuel Oxygen Burner," *Glass Industry*, vol. 76, No. 9, Aug. 1995, pp. 18–26.

L. Yap, "Non–Axisymmetric Jet Oxygen Lancing," *Ceramic Engineering and Science Proceedings*, vol. 11, 1990, pp. 175–194.

*Primary Examiner*—Sean Vincent
*Attorney, Agent, or Firm*—Burns, Doane, Swecker & Mathis, L.L.P.

[57] ABSTRACT

A combustion assembly adapted for a furnace is provided. The assembly includes an axis comprising at least one pair of burners having axes. An oxidant lance is arranged between the burners of the pair and has a lance axis. A source of oxidant is connected to the burners and to the lance. The combustion assembly can provide uniform heating of a charge of glass in a furnace.

30 Claims, 4 Drawing Sheets

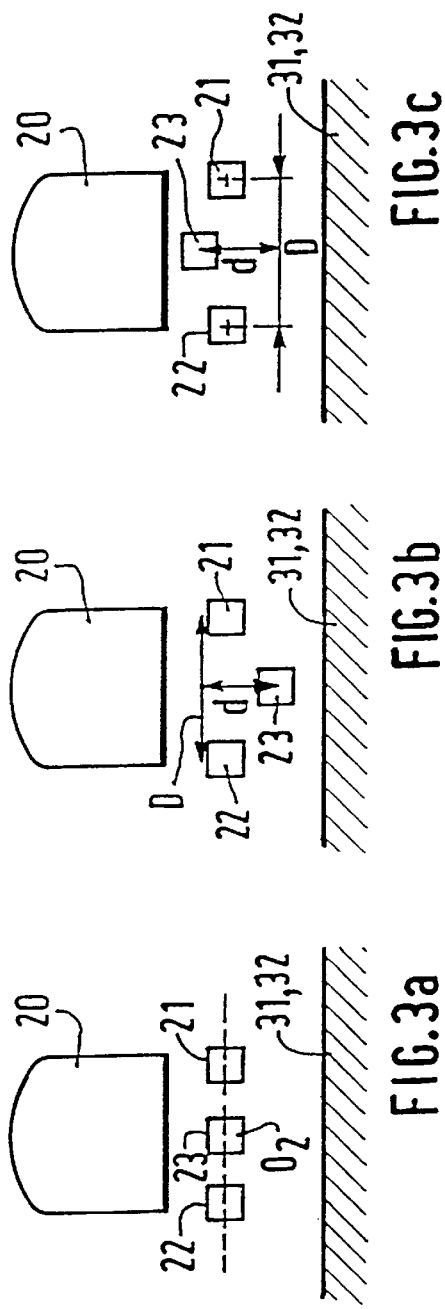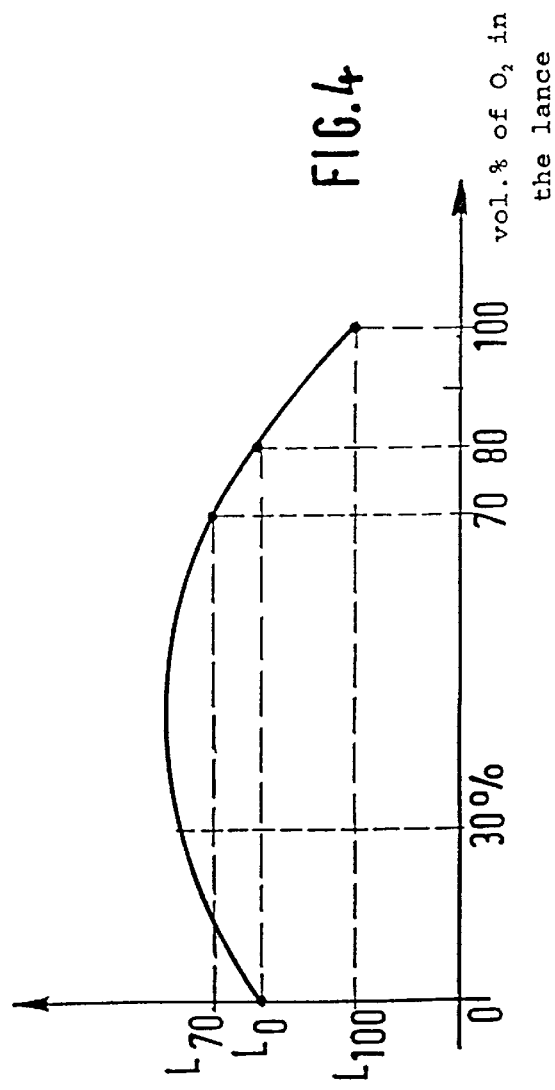

“METHOD AND APPARATUS FOR HEATING THE CHANGE OF A GLASS FURNACE”

This application is a divisional, of application Ser. No. 08/764,878, filed Dec. 16, 1996, now U.S. Pat. No. 5,853,448 which is a continuation-in-part of application Ser. No. 08/765,885, filed Jan. 8, 1997.

BACKGROUND OF THE INVENTION (i) Field of the Invention

The present invention relates to a method of heating the charge of a glass furnace.

(ii) Description of Related Art

Industrial furnaces, traditionally equipped with air-fuel burners, which burn a mixture of air and fuel, have recently seen the appearance of oxy-fuel burners, which burn a mixture of fuel and oxygen, substituting all or some of the conventional air-fuel burners. Generally, an oxy-fuel burner, in the manner of these air-fuel burners, takes the form of an individual device with localized ejection of fluids, which may frequently cause problems of temperature profiles and of the transfer of heat into the zone in question by the flame of the oxy-fuel burner.

In the glass industry, furnaces which traditionally operated with air-based burners are being increasingly equipped, partially or totally, with oxy-fuel burners. Although new furnaces may be readily designed to operate completely with oxygen (or in a general manner with mixtures of fuels and of oxidizers containing more than 50 volume % of oxygen and preferably more than 88 volume % of oxygen), current furnaces cannot be completely converted, that is to say by completely substituting the air-based burners simply with oxygen-fed burners since the combustion efficiencies of these burners are different, as are the flame geometries.

Thus, an air-based burner which heats a bath of glass uniformly cannot be replaced as it is with an oxygen-based burner which will have a tendency not to provide the same coverage of the bath of glass (for the same power).

Moreover, glass furnaces generally include regenerators (or recuperators) which make it possible to recover the heat from the hot gases of the flames before they are evacuated from the furnace. In the case of "end-fired" furnaces, there are usually two of these regenerators, placed in the upstream part of the furnace close to the zone where glass is fed into the furnace. In the case of cross-fired furnaces, the regenerators are located on each side of the furnace. In both cases, they are in communication with the furnace via openings called "ports", one port for each regenerator in the case of end-fired furnaces, regularly distributed along the side walls of the furnace, these ports being uniformly distributed along the side walls of the furnace in the case of transverse [sic] furnaces. Usually, fuel is injected below these ports from which are expelled air jets preheated by the heat of the regenerator.

In the case of cross-fired furnaces, the smoke from the flames formed are evacuated via the ports located in the opposite side wall, which also includes fuel injectors. The flames are regularly inverted (for example every twenty minutes) so as to heat the regenerators (which preheat the air sent into the furnace in order to create the flames, thereby saving energy) alternately.

In order to substitute the air (coming from the "port") and fuel (coming from the injectors) assembly with an oxy-fuel assembly, the most obvious solution consists in placing an oxy-fuel burner at the place of one of the fuel injectors, and in no longer using the other fuel injectors and in no longer using the influx of air via the port located above said injectors. The length of the oxygen flame thus obtained will be roughly equal to that of the air flame created previously, while at the same time replacing the power of the air-based burner.

This solution has the disadvantage of considerably reducing the coverage of the bath of glass by the flame. This is because the air flame, for example, with a width of approximately one meter to one meter fifty, is replaced by an oxygen flame with a width of approximately 40 centimeters.

In order to solve this reduction in coverage, it may be envisaged fitting not one but two burners of half power arranged side by side.

This solution has the advantage of allowing better coverage, widthwise, of the bath of glass by the flames but it has the major drawback of shortening the length of flame by approximately 40%.

In order to obtain an oxygen-based flame as wide and long as an equivalent air flame, the invention proposes using two oxy-fuel burners placed side by side and carrying out so-called staged combustion with respect to these two burners by adding a lance between the two burners and by distributing the oxygen between burners and lances. By preferably allowing only approximately 60% of the oxygen necessary for complete combustion of the flow of fuel into the burners and by transferring the approximately 40% remaining to the lance, it is possible to produce an oxygen flame having the same length and width characteristics as the air flame.

Staging of the combustion also makes it possible to reduce the temperature of the flame and to decrease the production of nitrogen oxide NOx.

From application WO 90/12760, it is known to increase the efficiency of a glass furnace operating with burners fed with air and a fuel by adding to the furnace several oxy-fuel burners, usually two oxy-fuel burners in the furnace-charging zone as well as two oxy-fuel burners in the glass-refining zone, so as to increase the thermal energy transferred to the glass.

However, such a furnace "boosting" system is added to the existing burners, which increases overall the energy supply.

In practice, such a solution cannot easily be applied since glass furnaces do not possess in general additional port [sic] via which new burners might be run into the furnace.

U.S. Pat. No. 5,116,399 describes a similar solution, in particular for furnaces of the end-fired type ("v or u" type flame, end-fired regenerative furnace) in which an oxy-fuel burner having a high flame momentum (velocity greater than 100 m/s) is placed in the front wall of the furnace, in the refining zone, so as to supply more energy to melt the glass and to keep the unmelted ingredients in the melting zone, by virtue of the high momentum of the flame. The additional drawback of such a method is that the high-momentum flame causes particles of unmelted glass to fly off throughout the furnace, which is prejudicial in the case of polluting dust emissions.

The commercial brochure entitled "GLASSMAN EUROPE '93—Industrial Experience with oxy fuel fired glass melters —presented at Glassman Europe 93—Lyon—France—Apr. 28, 1993" describes the boosting of glass furnaces, either of the cross-fired type or of the end-fired type, with regenerators or recuperators, using one or more oxy-fuel burners placed in the furnace, in addition to the existing air/fuel burners in the furnace, so as to increase the efficiency of the furnace.

All the abovementioned documents relate to the boosting of glass furnaces with additional oxy-fuel burners which are assumed to increase the energy transferred to the glass. However, none of them relates to the substitution of air-fuel burners with oxy-fuel burners and problems to be solved in order to obtain a glass furnace of superior efficiency with a reduction in fuel consumption.

SUMMARY AND OBJECTS OF THE INVENTION

The subject of the present invention is a method of heating a glass furnace in which at least one burner is placed in a wall of a furnace so as to heat the bath of glass, characterized in that at least one assembly consisting of a first and of a second burner which are fed with fuel gas and with oxidizer gas containing at least 50 vol. % of oxygen is arranged in one of the walls of the furnace at a distance at least equal to approximately 3 meters from each other, in that an oxygen lance is arranged between the first and second burners, the first burner, the second burner and the lance forming a combustion assembly and in that from approximately 30 vol. % to approximately 80 vol. % of oxidizer gas is sent into the lance and from approximately 20 vol. % to approximately 70 vol. % of oxidizer gas is sent to the first and second burners, in substantially equal proportions, so as to create a retarded combustion of the fuel and oxidizer gases and to extend substantially the length of the flame compared with the length of the flame obtained with no oxidizer gas injected into the lance.

Preferably, from approximately 30 vol. % to approximately 70 vol. % of oxidizer gas is sent into the lance, the complement being sent into the burners.

In a more general manner, the method according to the invention, which consists in using two oxy-fuel burners between which an oxygen lance is arranged, may be used as a method of adjusting the geometry (length and width) of an oxy-fuel flame so as to simulate or replace an air-fuel flame. As the oxygen flow rate in the lance tends toward zero, the length of the flame decreases, reaching its minimum value when this flow rate is zero. However, between 0% and approximately 30% by volume of oxygen injected into the lance, the length of the flame remains short and varies little, its length increasing substantially when more than approximately 30% by volume of oxygen is injected into the lance.

In contrast, the more the quantity of oxygen in the lance is increased the more the length of the flame increases, with a maximum length obtained in the case of separate fuel/oxidant/fuel injection, that is to say with 100% of the oxidant injected into the lance.

However, it has been observed that the luminosity of the flame, in this case, was markedly less than the luminosity of an air flame or of a flame obtained using two adjacent oxy-fuel burners, without oxygen being injected into the lance. However, the luminosity of a flame (related to the formation of soot) is directly related to the radiative transfer from the flame to the bath of glass, and in general the user prefers to obtain a flame which is at least as luminous as a flame obtained using an oxy-fuel burner without oxygen being injected into the lance. To this end, it has been observed, according to the method of the invention, that it was necessary to limit the injection of oxygen into the lance to at most 80 vol. %, preferably 70 vol. %, so as to obtain a sufficiently luminous flame and therefore a flame having as great a radiative power as that of an air flame.

In the case of glass furnaces of the "end-port" or "end-fired" type, that is to say having air injection ports placed in the end wall of the furnace and a loop-shaped flame above the bath of glass, it is preferable to provide an injection of oxygen into the lance of between approximately 50 vol. % and 80 vol. % of the total volume of oxygen delivered to the combustion assembly and preferably between 50 vol. % and 70 vol. %, so as to obtain a flame which is long enough to reach the refining zone. Of course, the production of a loop-shaped flame under the above conditions is preferably obtained with an additional injection of oxygen, in general with a lance or with an oxy-fuel burner, which is arranged somewhere in the furnace before the evacuation of the smoke via the port opposite to that located above the combustion system formed by the oxy-fuel burners and the oxygen lance.

In the case of a furnace of the "side-port" type or cross-fired furnaces in which the regenerators are placed on the sides of the furnace with side ports running into the furnace, the suitable luminosity of the flame is achieved by virtue of an injection of oxygen of between 30 vol. % and 80 vol. % and preferably from 30 vol. % to 70 vol. % of the total oxygen necessary for combustion of all the fuel.

Preferably, the end of the oxygen lance will be substantially aligned with the ends of the oxy-fuel burners, preferably at an equal distance therefrom.

However, depending on the type of atmosphere which it would be desired to generate above the bath (oxidizing or reducing atmosphere), the lance may be moved downward (oxidizing atmosphere) or upward (reducing atmosphere) with respect to the plane of the oxy-fuel burners.

If the distance between the ends of the burners (their center if these are cylindrical burners) is denoted by D and the distance between the oxygen injection lance and the plane, defined by the two oxy-fuel burners generally arranged so as to be substantially parallel to each other, is denoted by d, the following inequality (for the ratio D/d) must be satisfied in order to obtain acceptable staged combustion:

$$2 \leq D/d \leq 20$$

The term "oxygen" employed here denotes in general oxidizer gases, containing at least 50 vol. % of oxygen and preferably at least 88 vol. % of oxygen (including the oxygen delivered in particular by adsorption-type oxygen production apparatuses known by the name PSA (Pressure Swing Adsorption), VSA (Vacuum Switch Adsorption), etc.).

According to a preferred embodiment of the invention, the lance is arranged so that the axis of the lance lies substantially halfway between the axes of the burners and makes with them an angle of less than approximately 10° [lacuna] also preferably the distance between the axes of the two burners of the combustion system formed by two burners and one lance is between 0.4 m and 2 m, depending on the type of furnace.

According to another characteristic of the invention, the angle which the axis of a burner or that of the lance makes with respect to the horizontal plane is between ±25° and preferably ±20°.

Also according to another aspect of the invention, the ejection velocity of the oxygen, in particular in the oxygen lance, is not greater than 60 m/s and is preferably between 10 and 30 m/s, so as to avoid glass particles flying off in the furnace and the problems of polluting dust emission.

The invention applies equally well to furnaces of the end-fired type and to cross-fired furnaces, as described hereinabove.

In general, it is preferred for the combustion system to maintain a certain symmetry, that is to say that the two oxidizer/fuel burners are identical and preferably arranged in a parallel or symmetrical fashion, with the lance placed halfway, likewise in a symmetrical manner.

The oxidizer and fuel flow rates are also preferably identical in each of the burners.

Other characteristics and advantages of the present invention will emerge from the following description of embodiments, this being given by way of nonlimiting example, in conjunction with the figures which depict:

BRIEF DESCRIPTION OF THE DRAWINGS

FIG. 3 depicts a port of a glass melting furnace with various alternative forms of the combustion assembly according to the invention;

FIG. 4 depicts a diagrammatic curve of the luminosity of the flame as a function of the percentage by volume of total oxygen injected into the lance of a combustion assembly;

DETAILED DESCRIPTION OF PREFERRED EMBODIMENTS

Figure 1:
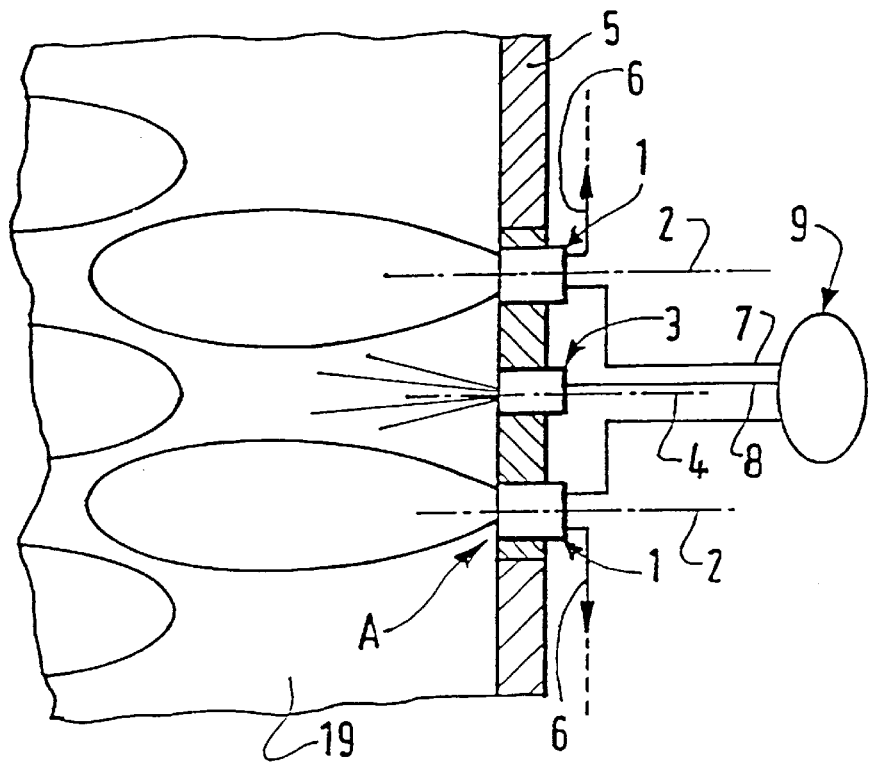
FIG. 1, a diagrammatic plan view of a portion of a glass melting furnace provided with a combustion assembly according to the invention.

FIG. 1 depicts a combustion assembly according to the invention, which comprises two burners 1 of the oxy-fuel type, the axes 2 of which are substantially parallel, and at least one oxygen lance 3, the axis 4 of which is parallel to that of the burners. The assembly is mounted in a wall 5 of a glass furnace, above the heated mass of glass 19. Preferably, the axes 2 and 4 are in the same plane. The axes 2 and 4 preferably make an angle of between ±20° with respect to the horizontal. The axis 4 of the lance 3 is preferably substantially equidistant from the axes 2 of the burners 1. The horizontal projections of the axes 2 and 4 make between them an angle which is between ±10°. In the case in which it is necessary to have a greater width of flame, it is possible within the scope of the invention to provide three, four, five, etc. burners arranged side by side, as explained hereinabove, two successive burners being separated by an oxygen injection lance. It is also possible, in particular when the furnaces are very wide, to place several combustion assemblies in different walls of the furnace, preferably opposite walls. Also preferably, these assemblies will be arranged in a staggered fashion, the axis of one burner in one wall being substantially halfway between the axes of two successive burners on the opposite wall.

The distance D between the axes 2 of two adjacent burners depends on the geometry of the furnace, on the power of the burners, etc., but it is always generally less than 3 meters and is preferably between approximately 0.4 m and 2 meters. It is often advantageous for better combustion distributed above the bath to have a divergent oxygen ejection system at the end of the lance: for example, in particular if it is desired for the quantity of motion or momentum of the oxygen to be quite high, it is possible to provide two similar nozzles at the end of the lance, of the same section, forming separate divergent jets: it is possible to provide two similar nozzles at the end of the lance with an angle of less than or equal to approximately 20°, preferably generating jets lying in the plane of the axes substantially parallel to the burners.

Each burner has feed lines 6 and 7, respectively a fuel feed line and an oxidant feed line, each lance 3 being provided with an oxidant feed line 8. According to one aspect of the invention, the oxidant lines of the same combustion assembly are connected to the same oxidant source 9 comprising more than 50 vol. % of oxygen and preferably at least 88% of oxygen, typically formed by an adsorption-type air separation unit of the so-called PSA (Pressure Swing Adsorption) or VSA (Vacuum Switch Adsorption) type. The fuel is advantageously in a gas form, typically natural gas, and may also be formed by atomization of liquid fuel by means of a gas such as air, the oxidant or steam, or by means of mechanical spraying or any other suitable means. According to one aspect of the invention, the burners of the same combustion assembly have the same fuel/oxidant flows, the total oxidant flow in the two burners being between 20 vol. % and 70 vol. % and preferably between 30 vol. % and 70 vol. % of the theoretical flow necessary for complete combustion of the fuel, the complement of oxygen necessary for complete theoretical combustion of the fuel being provided by the lance. It is even recommended to provide, in general, a supply of oxygen slightly greater than the theoretical quantity necessary for complete combustion by about at most 10 vol. % in excess, so as to remove all combustible products from the smoke before they are evacuated. This additional oxygen may, in some cases, be supplied by an additional oxygen lance or an oxy-fuel burner having an above-stoichiometric oxygen content.

Figure 2:
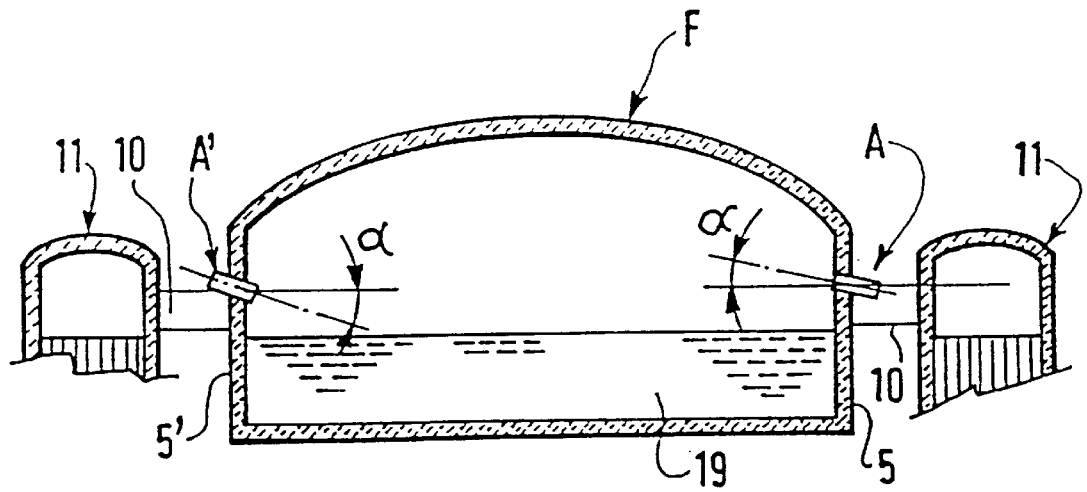
FIG. 2 is a diagrammatic vertical sectional view of a glass melting furnace equipped with combustion assemblies according to the invention.

The same furnace may include one or more combustion assemblies according to the invention in various sections, which combustion assemblies may or may not be combined with air-fuel burners, such as those appearing at 10, coupled to regenerators 11 depicted in the glass furnace F in FIG. 2.

FIG. 3 depicts a port of a glass melting furnace equipped with a combustion system according to the invention.

FIG. 3a depicts a first configuration of the combustion system according to the invention. In a glass furnace operating with air-based burners, the port 20 is in communication with a regenerator of the furnace, normally used to preheat the air which is subsequently sent through this port into the furnace, while the fuel is injected into the furnace via injectors placed under this port 20.

Within the context of the invention, the port is no longer used to discharge preheated air. It may, on the other hand, continue to be used for the evacuation of combustion smoke from the furnace or alternatively perhaps [sic] closed, totally or partially. Placed under this port, where the fuel injectors are normally placed, is the combustion system according to the invention, which includes an oxy-fuel burner 22, an oxygen lance 23 and a second oxy-fuel burner 21, the lance and the two burners being substantially in the same plane and equidistant.

FIG. 3b depicts an alternative form of the configuration in FIG. 3a, in which an oxidizing atmosphere is produced directly above the bath of glass 31, 32 by shifting the oxygen lance 23 toward the surface of the bath of glass 31, 32.

The ratio between the distance D between the two burners (less than 3 meters) and the distance d between the lance and the plane defined by the two burners 21, 22 is between approximately 2 and 20.

FIG. 3c depicts the opposite configuration to that in FIG. 3b, which corresponds to the case in which the user wishes to have a reducing flame above his bath of glass, the ratio D/d varying in the same proportions.

In this FIG. 3, the momentum of the oxidant flow emitted by the lance 23 of an assembly is preferably between 0.5 and 3 times the momentum of the oxidant/fuel flow emitted by a burner 21, 22 of the assembly.

FIG. 4 depicts a curve illustrating the luminosity of the flame from the combustion assembly as a function of the percentage of oxygen injected into the lance with respect to the total oxygen supplied to the combustion system.

When the percentage of oxygen supplied to the lance is equal to zero, the luminosity of the flame formed by the two adjacent oxy-fuel burners is equal to $L_0$.

When the percentage of oxygen injected into the lance increases, the luminosity of the flame increases until approximately 40 to 60 vol. % of the oxygen is injected into the lance and then decreases, reaching a luminosity in the region of $L_0$ for approximately 80% of the total oxygen injected into the lance. For 100% oxygen injected into the lance, a configuration of separate injection of oxygen and of fuel is again found, which corresponds to a flame of luminosity $L_{100}$ which is markedly less than $L_0$.

The luminosity $L_{70}$, corresponding to 70% of oxygen injected into the lance is in general markedly greater than $L_0$ and is regarded as being the preferred limit for obtaining a flame of superior luminosity to that of an oxy-fuel burner.

FIG. 5 depicts the implementation of the invention in an "end-fired" furnace.

Figure 5A:
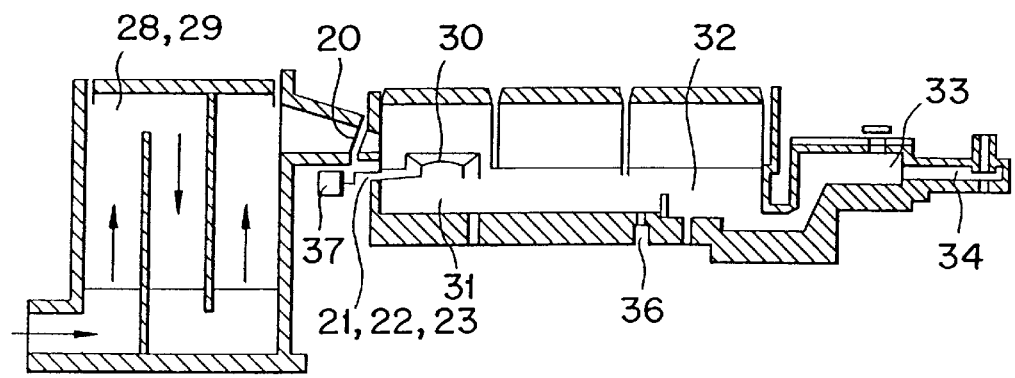
FIG. 5 illustrates the invention in the case of an "end-fired" furnace.
Figure 5B:
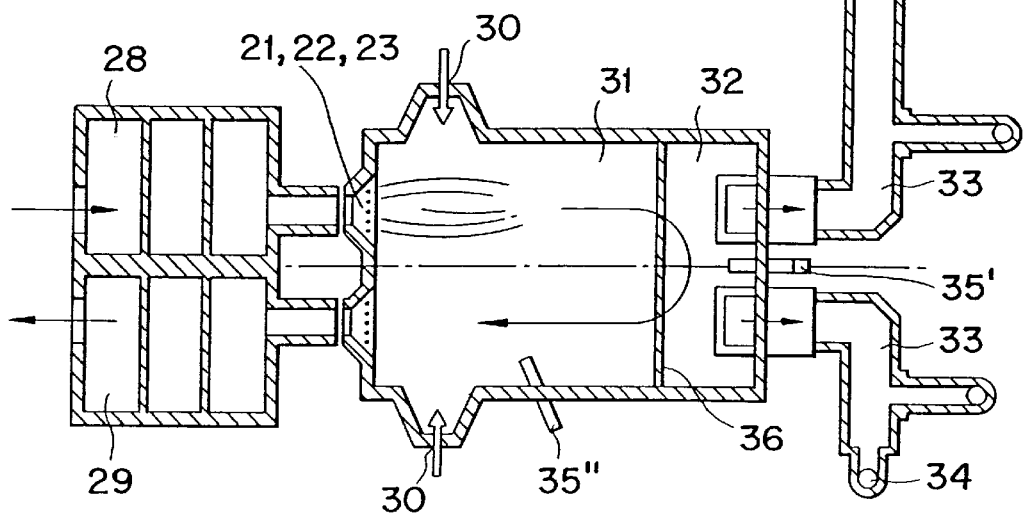

FIG. 5a is a longitudinal sectional view of an end-fired furnace with regenerators, equipped with a combustion system according to the invention, FIG. 5b representing a view of the same furnace from above.

When air-based combustion is used in an end-fired furnace, the air entering the furnace, for example, via the regenerator 28, is preheated in this regenerator and then sent into the furnace while fuel is injected under the port 20, thus generating a long loop-shaped flame which, having reached the back of the furnace (the refining zone) returns toward the entry wall of the furnace, the smoke being evacuated via the port corresponding to the regenerator 29 which is then heated by heat exchange between the smoke and the refractories arranged in the baffles of the regenerator 29. Approximately every twenty minutes, the system is switched over, that is to say the air is injected via the regenerator 29, the fuel via the injectors placed under the air inlet port of the regenerator 29 and the smoke is evacuated via the regenerator 28.

Using the system of the invention, that is to say by placing the combustion assembly 21, 22, 23 under the "port" 20 (as explained in FIG. 3) the regenerator, for example 28, corresponding to the port 20 placed above the combustion assembly is no longer used. The regenerator 29 is used only to evacuate the smoke.

Glass continues to be fed into the furnace via the chargers 30, the flame heating in succession the melting zone 31 and the refining zone 32 placed beyond the array of bubblers 36. The molten refined glass flows out via the channels 33 toward the systems for feeding the glass forming machines or "feeders" 34. Depicted diagrammatically by 37 is the system of valves (not detailed in FIG. 6) which makes it possible to distribute the oxygen coming from the production apparatus (e.g. a "VSA" unit or a liquid-oxygen storage unit, the system of valves being known per se by those skilled in the art [lacuna].

FIG. 6 depicts the application of the combustion system according to the invention on a so-called cross-fired furnace.

Figure 6A:
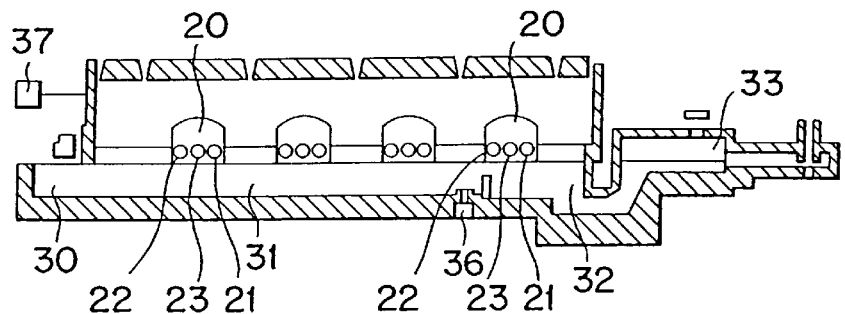
FIG. 6 illustrates the invention in the case of a cross-fired furnace.
Figure 6B:
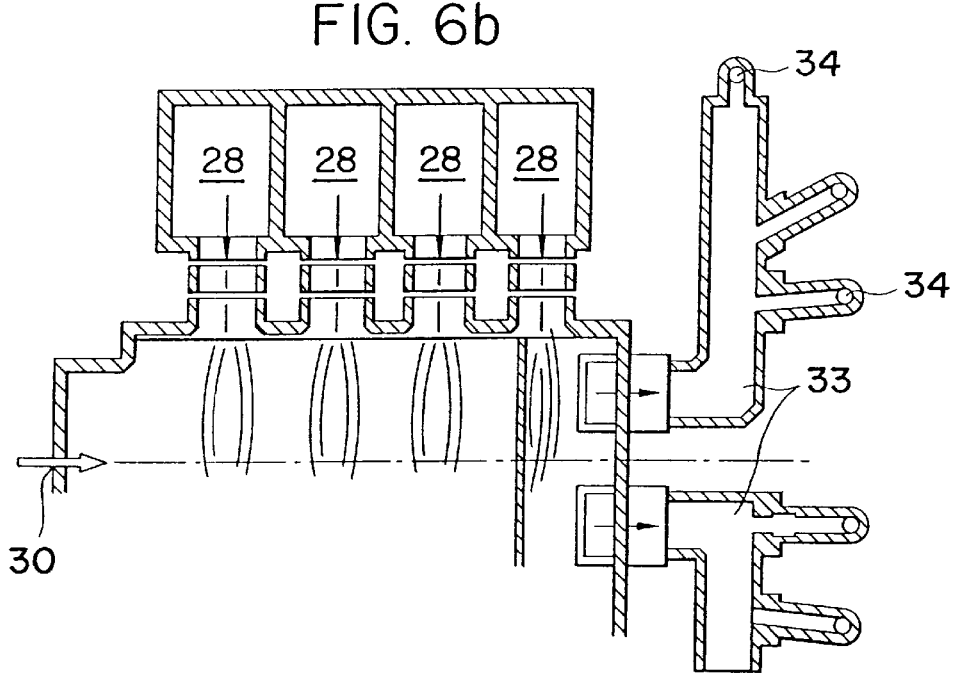
Figure 6C:
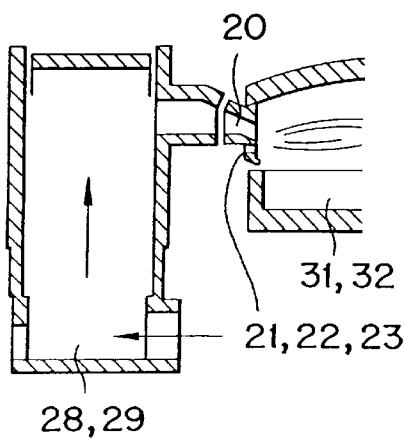

FIG. 6a is a vertical sectional view in the direction of flow of the glass of a furnace of this type, FIG. 6b is a partial view from above and FIG. 6c is a vertical sectional view perpendicular to the direction of flow of the glass in the furnace.

This type of furnace normally has air-based combustion systems placed on each side wall and operating alternately approximately every 20 to 30 minutes.

According to the invention, at least one air-based combustion assembly formed by an air feed port and fuel injectors placed under it is replaced with a combustion assembly according to the invention, in one of the configurations in FIG. 3. It is possible to replace one or more assemblies (port+fuel injectors), which may or may not be adjacent and may or may not be opposite each other, with a combustion assembly according to the invention. Since the system according to the invention does not use a regenerator, it is preferable, however, for the furnace to maintain a certain symmetry by placing combustion systems according to the invention so as to face each other unless, for example, one of the regenerators is damaged, in which case it may be advantageous to place only a single combustion system according to the invention at a position corresponding to the regenerator.

We claim:

1. Combustion assembly adapted for a furnace, comprising at least one pair of burners having axes, an oxidant lance arranged between the burners of the pair and having a lance axis, and a source of oxidant connected to the burners and to the lance;

wherein said burner axes are arranged at a distance D from each other, and said lance axis is offset with respect to the plane of said burner axes by a distance d such that $2 \leq D/d \leq 20$.

2. Assembly according to claim 1, wherein the lance axis is located substantially halfway between the burner axes.

3. Assembly according to claim 2, wherein the lance axis makes an angle with a burner axis not exceeding 10°.

4. Assembly according to claim 1, wherein the distance D between the two burner axes is between 0.4 and 2 meters.

5. Assembly according to claim 1, wherein the lance axis is substantially coplanar with the burner axes of the pair of burners.

6. Assembly according to claim 1, wherein the lance comprises at least two divergent oxidant ejection orifices.

7. Assembly according to claim 5, wherein the ejection orifices diverge in the plane of the axes.

8. Combustion furnace comprising at least one sidewall comprising at least one combustion assembly according to claim 1, said at least one combustion assembly being mounted in the sidewall.

9. Furnace according to claim 5, wherein the plane of the axes of the assembly and the horizontal are at an angle which is between −25 and +25°.

10. Furnace according to claim 8, comprising two opposite sidewalls and at least one pair of combustion assemblies mounted so as to face each other in the opposite sidewalls.

11. The combustion furnace according to claim 8, further comprising a bath of glass, and wherein said at least one combustion assembly is arranged such that said oxidant lance axis is positioned between said bath of glass and the plane formed by said burner axes.

12. The combustion furnace according to claim 8, further comprising a bath of glass, and wherein said at least one combustion assembly is arranged such that the plane formed by said burner axes is positioned between said oxidant lance axis and said bath of glass.

13. A combustion assembly adapted for a furnace, comprising:
   at least one pair of burners having axes,
   an oxidant lance arranged between the burners of the pair and having a lance axis coplanar with the burner axes of the pair of burners, and
   a source of oxidant connected to the burners and to the lance.

14. Method of heating a charge of a glass furnace comprising at least one burner placed in a wall of a furnace so as to heat a bath of glass, comprising the steps of (i) feeding a fuel gas and an oxidizer gas comprising at least 50% of oxygen to a first and a second burner of a combustion assembly arranged in one of the walls of the furnace, said first and second burners being at a distance (D) of less than approximately 3 meters from each other, and (ii) feeding oxidizer gas to an oxygen lance arranged between the first and second burners, the first burner, the second burner and the lance forming a combustion assembly, wherein from approximately 30 vol. % to approximately 80 vol. % of oxidizer gas is sent into the lance and from approximately 20 vol. % to approximately 70 vol. % of oxidizer gas is sent to the first and second burners in substantially equal proportions, so as to create a retarded combustion of the fuel and oxidizer gases and to extend substantially the length of a flame compared with the length of the flame obtained with no oxidizer gas injected into the lance.

15. Method according to claim 14, wherein approximately 30 vol. % to approximately 70 vol. % of oxidizer gas is sent into the lance, the complement being sent into the burners.

16. Method according to claim 14, wherein the first and second burners together with the lance lie substantially in the same plane.

17. Method according to claim 14, wherein the lance lies in a plane which is offset with respect to a plane of the first and second burners.

18. Method according to claim 17, in which the first and second burners are arranged at a distance D from each other, and the lance is offset with respect to the plane of the first and second burners by a distance d such that:

$$2 \leq D/d \leq 20.$$

19. Method according to claim 17, wherein, with respect to the bath of glass, the lance is placed above the first and second burners so as to obtain a reducing atmosphere above the bath.

20. Method according to claim 17, wherein, with respect to the bath of glass, the lance is placed below the plane of the first and second burners so as to obtain an oxidizing atmosphere above the bath.

21. Method according to claim 14, in which the furnace is end-fired and further comprises (I) at least two ports in communication with a regenerator which are placed in a rear wall of the furnace in the proximity of a glass-charging zone and (ii) a smoke evacuation port, wherein the combustion assembly is placed below a port in communication with the regenerator, an oxidizer lance or burner fed with fuel and with oxidizer, said oxidizer containing more than 50 vol. % of oxygen, is arranged in the furnace in front of the smoke evacuation port and between 50 vol. % and 80 vol. % of oxidizer feeding the combustion assembly is injected into the lance.

22. Method according to claim 14, wherein the furnace is cross-fired and further comprises a plurality of air-injection-port/fuel-injection assemblies arranged in at least one wall of the furnace, wherein at least one combustion assembly is fitted in one of the walls of the furnace in order to replace an air-injection-port/fuel-injectors assembly.

23. Method according to claim 14, wherein the lance and burners have axes and wherein the axis of the lance lies substantially halfway between the axes of the burners.

24. Method according to claim 23, wherein the axis of the lance makes an angle not exceeding 10° with the burner axis.

25. Method according to claim 14, wherein the lance and burners have axes, and the axes of the burners are separated from the axis of the lance by a distance between 0.4 and 2 meters.

26. Method according to claim 14, wherein the lance comprises at least two oxidant ejection nozzles, each of which has an axis defining a plane, wherein said nozzles diverge in the plane of the axes.

27. Method according to claim 14, wherein the oxidizer gas feeding the burners and the lance comprises at least 88% of oxygen.

28. Method according to claim 27, wherein the burners of the assembly have the same fuel/oxidizer gas flow rates.

29. Method according to claim 14, wherein the oxidizer gases emitted by the lance and by the burners of the assembly have momentums such that the momentum of the oxidizer gas emitted by the lance is between 0.5 and 3 times the momentum of the oxidizer gas fuel flow emitted by the burners of the assembly.

30. Method according to claim 2, wherein the oxidizer gas is supplied by an absorption air separation plant.

* * * * *